United States Patent Office.

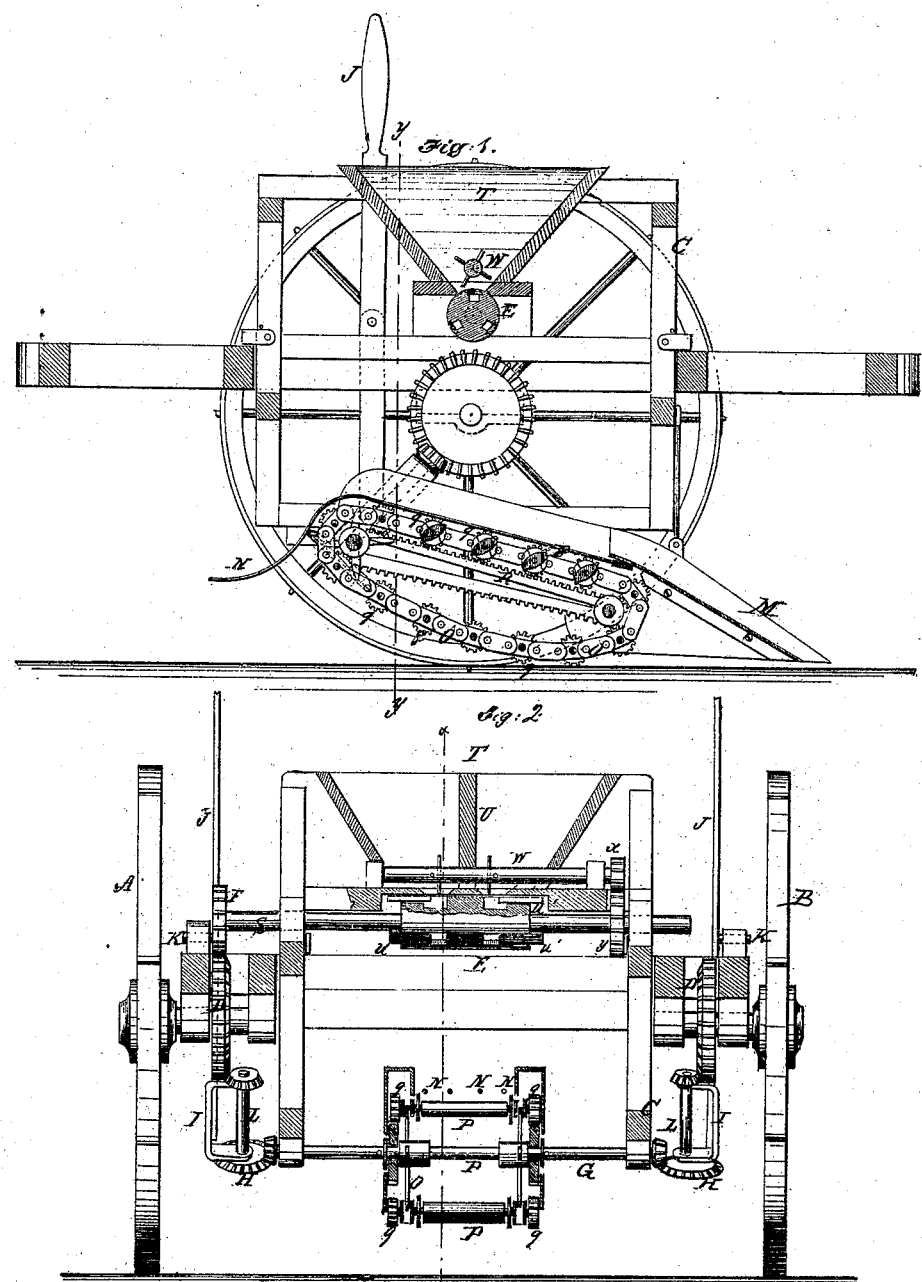

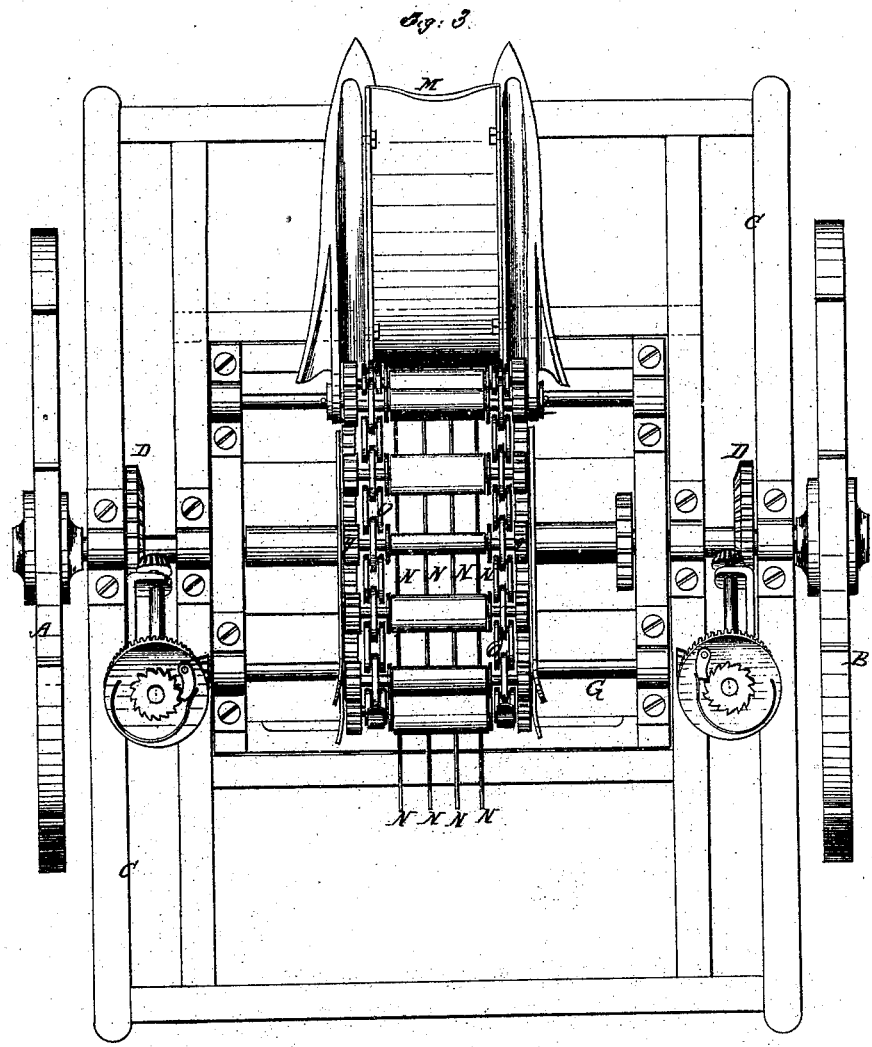

EUGENE C. HOPPING AND EUGENE A. ELY, OF MADISON, NEW JERSEY.

Letters Patent No. 111,062, dated January 17, 1871.

IMPROVEMENT IN COMBINED SEED-DRILLS, MANURERS, AND POTATO-DIGGERS.

The Schedule referred to in these Letters Patent and making part of the same.

*To all whom it may concern:*

Be it known that we, EUGENE C. HOPPING and EUGENE A. ELY, of Madison, in the county of Morris and State of New Jersey, have invented a new and useful Improvement in Combined Seed-Drill, Manurer, and Potato-Digger; and I do hereby declare that the following is a full, clear, and exact description thereof, which will enable others skilled in the art to make and use the same, reference being had to the accompanying drawing forming part of this specification.

This invention relates to a new and useful improvement in seed-drills and potato-diggers, and to a combination of the two machines, and consists in the feed-cylinder for distributing the seed and fertilizer, and in a partition in the hopper, by which the seed and the fertilizer are separated, and in the employment of a re-revolving chain-apron with revolving wings for carrying and properly sifting the potatoes after they have been raised from the ground, and in the combination of the seed and manure-drill and potato-digger, the two being arranged to operate separately on the same pair of traction-wheels, as will be hereinafter more fully described.

In the accompanying drawing—

Figure 1 represents a vertical section of the machine taken on the line $x\ x$ of fig. 2.

Figure 2 is a vertical section taken on the line $y\ y$ of fig. 1.

Figure 3, Sheet II, is a view of the under side, the machine being reversed to show the endless chain and revolving wings.

Similar letters of reference indicate corresponding parts.

The operating parts of this combined machine are actuated by means of two traction-wheels A and B.

C is a frame with double longitudinal rails, which supports a short axle for each of the wheels.

Upon each axle there is a spur-wheel, D, from one of which motion is imparted, to drive the distributing-cylinder E, beneath the hopper.

F is the spur-wheel, on the end of the shaft of the distributing-cylinder.

Each of the spur-wheels has bevel-cogs on their inner sides, from which motion is conveyed to the shaft G of the potato-digger endless chain. This arrangement is plainly seen in fig. 2.

The bevel-wheels H H' are supported by brackets I I, which are attached to the levers J J.

By removing the small pins K K which pass through holes in the levers, the operator is enabled to throw the bevel-wheels out of gear, so as to stop or prevent the rotation of the endless chain.

L L are the shafts of the bevel-wheels H H.

On the ends of these shafts are ratchet-wheels, with spring-pawls on the backs of the bevel-wheels, the ratchets and pawls being so arranged that the bevel-wheels will be revolved only when the machine is moving forward.

A back movement causes the pawls to slip over the teeth of the ratchet. This arrangement is plainly seen in the reverse view, fig. 3.

M is a potato-digger share and inclined plane, the forward end of which is designed to run beneath the rows or hills of potatoes.

As the machine moves forward the potatoes and earth are shoved up the inclined plane together and delivered onto the loose wire grate-rods N. These rods N are attached to the top of the inclined plane, and extend back and bend down over the back end of the chain, as seen in fig. 1.

O represents the endless chain, which, as before stated, is revolved by means of the shaft G.

P represents the wings of the chain O, which extend across from one chain to the other, with small cog-wheels $q$ upon the ends of their shafts. These wheels engage with the stationary cogged racks R R.

It will be seen that as the chains which carry the wings are revolved the wings will receive an independent rotary motion, and that as they revolve they will agitate the rods N and effectually clear the potatoes from earth. The earth will drop between the wings as the potatoes are moved back, while the potatoes are delivered upon the surface of the ground clean and ready for market.

S is the shaft of the seed-drill and manuring-cylinder E.

T is the hopper.

U is a partition which divides the hopper into two parts, one for the seed, and the other for the fertilizer.

The distributing-cylinder E has two sets of cups or cavities, which receive the seed and fertilizer as the cylinder revolves under the compartments of the hopper, from which cups or cavities they drop at uniform intervals.

The quantity of the seed, as well as of the fertilizer, is regulated by the slides U', which are dovetailed into the cylinder, and are adjustable, as may be desired.

The cups or cavities are constructed so as to receive and deliver the seed and fertilizer to the best advantage.

By forming separate compartments in the hopper and separate cups or cavities in the distributing-cylinder, either compartment can be used without the other, as may be desired.

W is an agitating-rod, which passes horizontally through the hopper, with wire teeth therein, as seen in figs. 1 and 2.

This rod is revolved by means of the pinion-wheel

X on its end, which engages with the spur-wheel Y on the end of the distributing-cylinder shaft, seen in fig. 2.

Delivering-tubes (elastic or otherwise) may be arranged beneath the respective cups for conveying the seed and fertilizer to the ground. The drill portion of the machine is so constructed that it may be removed from the frame C when the potato-digger is in use; and the potato-digger is so constructed and supported that it may be removed when it is desired to use the drill; but the same wheels and general supporting-frame C, which embrace a large portion of the expense of a seed-drill, as well as a potato-digger, are used for both objects.

By combining the two machines, as shown and described, the expense is greatly reduced, while all the advantages of two machines of the most approved construction are secured.

Having thus described our invention,

We claim as new and desire to secure by Letters Patent—

1. In combination with a potato-digger, the chain O, with the rotating-wings P and wires N, arranged to operate substantially as and for the purposes herein shown and described.

2. The stationary racks R R, for rotating the wings of the endless chain, substantially as described.

EUGENE C. HOPPING.
EUGENE A. ELY.

Witnesses:
WM. F. ELY,
J. LIVINGSTON ELY.